(12) United States Patent
Akiho et al.

(10) Patent No.: US 7,198,198 B2
(45) Date of Patent: Apr. 3, 2007

(54) ANTENNA DEVICE AND COMMUNICATION DEVICE USING ANTENNA DEVICE

(75) Inventors: Hiraku Akiho, Miyagi (JP); Yutaka Okazaki, Tokyo (JP); Akihiro Kikuchi, Chiba (JP); Kazuo Goto, Kanagawa (JP); Kazuhiko Urayama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/496,636

(22) PCT Filed: Aug. 28, 2003

(86) PCT No.: PCT/JP03/10985

§ 371 (c)(1),
(2), (4) Date: May 24, 2004

(87) PCT Pub. No.: WO2004/029869

PCT Pub. Date: Apr. 8, 2004

(65) Prior Publication Data

US 2004/0256468 A1    Dec. 23, 2004

(30) Foreign Application Priority Data

Sep. 25, 2002    (JP) .............................. 2002-279626

(51) Int. Cl.
*G06K 19/06*    (2006.01)
*H01Q 11/12*    (2006.01)

(52) U.S. Cl. ...................................... 235/492; 343/746

(58) Field of Classification Search ................. 343/702, 343/700 MS, 742, 867, 895; 231/491, 436, 231/438, 492; 235/491, 436, 438, 492
See application file for complete search history.

(56) References Cited

U.S. PATENT DOCUMENTS 5,424,527 A * 6/1995 Takahira .................... 235/492
5,821,525 A * 10/1998 Takebayashi ............... 235/492
6,373,708 B1 * 4/2002 Ando et al. ................. 361/737

(Continued)

FOREIGN PATENT DOCUMENTS

| DE | 19542900 A1 | 11/1995 |
|----|-------------|---------|
| JP | 09139698 A | 11/1995 |
| JP | 10-157353 | 6/1998 |
| JP | 10-157353 A | 6/1998 |
| JP | 2000-162314 | 6/2000 |
| JP | 2000-162314 A | 6/2000 |

*Primary Examiner*—Shih-Chao Chen
*Assistant Examiner*—Minh Dieu A
(74) *Attorney, Agent, or Firm*—Wolf, Greenfield & Sacks, P.C.

(57) ABSTRACT

An antenna device (60) is provided that is used in a recorder and/or writer destined for writing and reading data to and from a contactless IC card (1). The antenna device (60) includes a loop coil (61) that radiates a magnetic field, magnetically couples with a loop coil (4) provided in the IC card (1), and sends and receives data to and from the IC card (1). The loop coil (61) is formed asymmetric for the winding sections thereof opposite to each other across the center of the loop coil (61) to be different in interval from each other.

9 Claims, 9 Drawing Sheets

U.S. PATENT DOCUMENTS

| | | | |
|---|---|---|---|
| 6,591,494 B2 * | 7/2003 | Okamura et al. | 29/832 |
| 6,593,167 B2 * | 7/2003 | Dobashi et al. | 438/107 |
| 6,597,323 B2 * | 7/2003 | Teshirogi et al. | 343/786 |
| 6,879,297 B2 * | 4/2005 | Brown et al. | 343/786 |
| 6,879,298 B1 * | 4/2005 | Zarro et al. | 343/786 |
| 7,000,837 B2 | 2/2006 | Akiho et al. | |
| 2001/0000659 A1 * | 5/2001 | Hayashi et al. | 340/10.34 |
| 2003/0016506 A1 * | 1/2003 | Fujii | 361/737 |

* cited by examiner

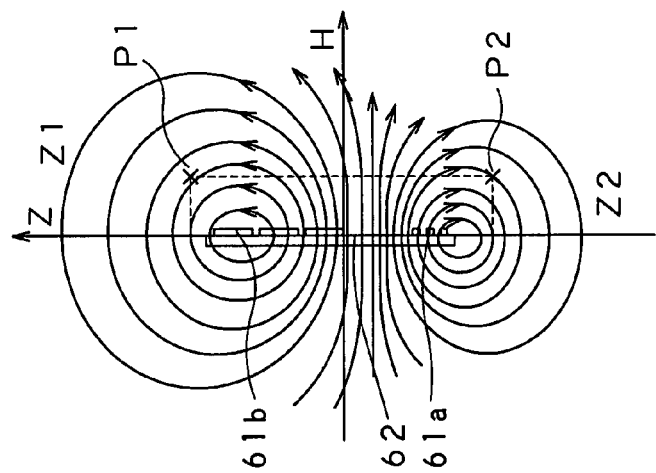
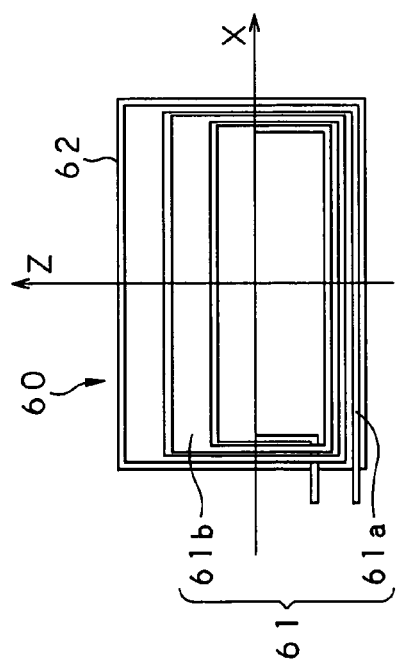
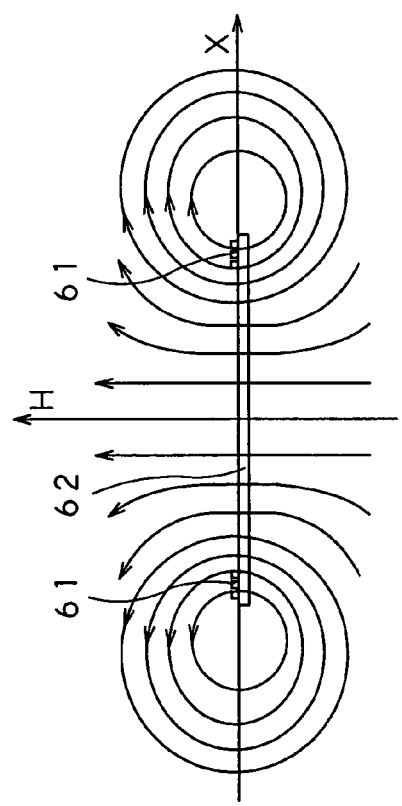
FIG.7A
FIG.7B
FIG.7C

US 7,198,198 B2

ANTENNA DEVICE AND COMMUNICATION DEVICE USING ANTENNA DEVICE

TECHNICAL FIELD

This application is a 371 of PCT/JP03/10985 Aug. 28, 2003.

The present invention relates to a reader/writer antenna device for writing and reading data to and from a contactless IC (integrated circuit) card adopting the technique of electromagnetic-inductive coupling and a communication device using the antenna device.

This application claims the priority of the Japanese Patent Application No. 2002-279626 filed on Sep. 25, 2002, the entirety of which is incorporated by reference herein.

BACKGROUND ART

Recently, a so-called RFID (radio frequency identification) system using a contactless IC card, IC tag or the like has been introduced into the fields of art such as an automatic ticket checker used in the railway station, security system for checking people going to enter or exit from a building, electronic money system, etc. As schematically illustrated in FIG. 1, the RFID system includes a contactless IC card 100 and a reader/writer 101 to write and read data to and from the IC card 100. The RFID system adopts the theory of electromagnetic induction. An electromagnetic field radiated from a loop antenna 102 provided at the reader/writer 101 is coupled by the electromagnetic induction to a loop antenna 103 provided at the IC card 100 to provide communications between the IC card 100 and reader/writer 101.

In the above RFID system, the IC card has not to be inserted into the reader/writer to put metallic contacts into contact with each other as in the conventional contactless IC card systems. Therefore, data can be written to, and read from, the IC card easily and quickly. Also, in the RFID system, the electromagnetic field radiated from the reader/writer 101 provides a necessary power to the IC card 100 and thus any power source such as a battery or cell has not to be provided in the IC card. Therefore, the IC card used in the RFID system can be excellent in maintainability, lower in price and higher in reliability.

In the above RFID system, the loop antenna 102 provided at the reader/writer 101 should be able to radiate an electromagnetic field having a certain degree of magnetic strength in order to assure a satisfactory range of communications between the IC card 100 and reader/writer 101.

Generally, the loop antenna 102 for the reader/writer 101 includes a loop coil 200 formed from a plane winding of a conductor as shown in FIG. 2. The loop coil 200 is formed symmetric for winding sections thereof opposite to each other across the center of the loop coil 200 to be equal in interval and width to each other.

In the above symmetric loop antenna 102 for the reader/writer 101, the magnetic field is distributed symmetrically with respect to a Z-directional section through the center of the loop antenna 102, perpendicular to the long sides of the rectangular antenna and also to an X-directional section through that center, perpendicular to the short sides, as shown in FIG. 3.

FIG. 4 shows the dependence upon the card position of the strength of a current induced by the loop antenna 102 to the IC card 100. As shown, two communication areas $S_1'$ and $S_2'$ are formed in positions, respectively, opposite to each other across the center of the loop coil 200. More particularly, the-communication area $S_1'$ assures an ideal magnetic coupling. Namely, magnetic fields developed at four sides of the loop antenna 102 at the reader/writer 101 are inductively coupled to those developed at four sides of the loop antenna 103 at the IC card 100, opposite to the four sides, respectively, of the loop antenna 102. Outside the communication area $S_1'$, there is an area where magnetic fields crossing the loop antenna 103 at the reader/writer 101 cancel each other in a central area where the magnetic fields developed around the loop antenna 102 at the reader/writer 101 are inverted in direction. In this outer area, the induced current will have a lower level than the necessary level for the communications. Outside the above outer area, there is the communication area $S_2'$ where only one of the four sides of the loop antenna 102 at the reader/writer 101 is coupled to one of the four sides of the loop antenna 103 at the IC card 100. Therefore, the communication area $S_2'$ is narrower than the communication area $S_1'$, and the induced current in this communication area $S_2'$ is smaller than that in the communication area $S_1'$.

Note that in FIG. 4, the origin "0" of the horizontal axis indicates the center of the loop antenna 102 at the reader/writer 101 and the positive-going direction indicates a direction from the center (origin "0") toward outside of the IC card 100. The vertical axis indicates the strength of the current electromagnetically induced in the loop antenna 103 at the IC card 100 under the action of the magnetic field in the loop antenna 102 at the reader/writer 101. Communications are possible in an area where the strength of the induced current has a value larger than a value indicated with a dashed line s' in FIG. 4.

Note here that when the communication area $S_1'$ is continuously wider as far as possible outwardly of a point, namely, the origin "0", where the center of the loop antenna 103 at the IC card 100 coincides with that of the loop antenna 102 at the reader/writer 101, the RFID system will be easier to use.

That is to say, in a direction the origin "0" toward outside of the above conventional loop coil 200, the communication area $S_1'$ is followed by a non-communication area once, and then by the communication area $S_2'$. It is desirable from the practical point of view that no non-communication area should exist between the communication areas $S_1'$ and $S_2'$ or only the communication area $S_1'$ should spread.

DISCLOSURE OF THE INVENTION

Accordingly, the present invention has an object to overcome the above-mentioned drawbacks of the related art by providing an improved and novel antenna device and a communication device using the antenna device.

The present invention has another object to provide an antenna device used on a reader/writer and which can provides an expanded range of communications with an IC card by controlling, and effectively utilizing, the distribution of a radiated electromagnetic field, and a communication device using the antenna device.

The above object can be attained by providing an antenna device that makes data communications with a contactless IC card by electromagnetic-inductive coupling, the device including according to the present invention:

an asymmetric loop coil formed from a plane winding of a conductor, whose sections opposite to each other across the center of the loop coil are different in interval from each other; and a lead means for supplying a power to the loop coil.

In the winding section in the above antenna device, of which the winding interval is larger than that in the opposite winding section, a wider range of communications with the IC card can be achieved.

Also, the above loop antenna is smaller in plane area than a loop antenna included in the IC card.

Also in the loop coil of the above antenna device, the winding interval should preferably be wider in a plurality of positions other than a first position.

The loop coil is formed to have a generally square shape having four straight sides.

Also, the above object can be attained by providing a communication device that makes data communications with a contactless IC card by electromagnetic inductive coupling, the device including according to the present invention:

an antenna capable of electromagnetic inductive coupling with an antenna included in the contactless IC card;

a modulating means for modulating send data to a predetermined carrier signal in order to communicate with the IC card with no contact with the antenna; and a demodulating means for demodulating receive data sent from the IC card electromagnetically coupled to the antenna.

The antenna is disposed in a predetermined place on a housing of the communication device, in which it can be electromagnetically coupled to the contactless IC card. The antenna is a loop coil formed by winding a conductor like a loop generally in a plane for winding sections thereof opposed to each other across the center of the loop to be different in interval from each other.

One of the winding sections of the loop coil, that is wider in winding interval than the other, is disposed near a position on a housing of the communication device where communications with the IC card is made.

The communication device according to the present invention is of a hand-held type.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 7A to 7C show characteristic curves, respectively, of the distribution of magnetic field developed around the antenna device according to the present invention.

BEST MODE FOR CARRYING OUT THE INVENTION

The present invention will be described in detail concerning the antenna device and the communication device using the antenna device as the embodiments thereof with reference to the accompanying drawings.

Figure 5:
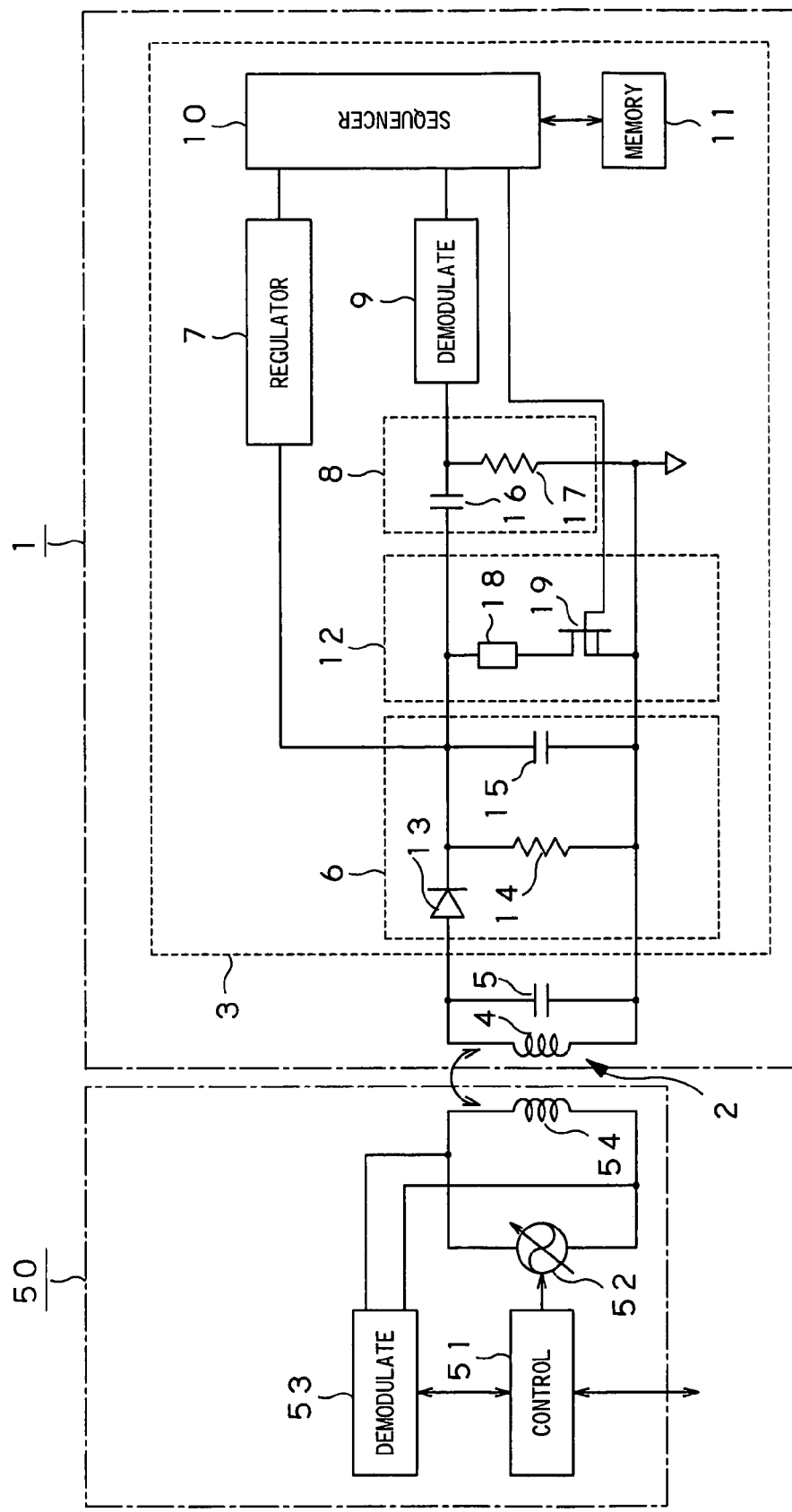
FIG. 5 is a circuit diagram of an RFID system according to the present invention.

As shown in FIG. 5, the RFID system according to the present invention is composed of a contactless IC card 1, and a reader/writer (will be referred to as "R/W" hereunder) 50 to write and read data to and from the IC card 1.

The IC card 1 is of a battery-less type compliant with ISO 7810, for example. Namely, it has no power source such as a battery or cell. The IC card 1 is formed rectangular to have the same size as the so-called credit card, namely, it is palm-sized. The IC card 1 has provided on a circuit board built therein a loop antenna 2 that couples with an electromagnetic field to send and receive data, and an IC (integrated circuit) 3 having integrated therein electronic circuits that make various operations for writing and reading data.

The loop antenna 2 includes a loop coil 4 formed from a plane winding of a conductor, and forms a resonant circuit along with a capacitor 5 connected in parallel with the loop coil 4. The loop antenna 2 couples with an electromagnetic field radiated from a loop antenna provided at an R/W 50 that will be explained in detail later, converts the electromagnetic field into an electrical signal, and supplies the signal to the IC 3.

The IC 3 includes a rectification circuit 6 to rectify and smooth the electrical signal supplied from the loop coil 4, a regulator 7 to converter the electrical signal supplied from the rectification circuit 6 into a DC power, an HPF (high-pass filter) 8 to extract a high-frequency component from the electrical signal supplied from the rectification circuit 6, a demodulation circuit 9 to demodulate the high-frequency component supplied from the HPF 8, a sequencer 10 to control data write and read correspondingly to data supplied from the demodulation circuit 9, a memory 11 to store the data supplied from the demodulation circuit 9, and a modulation circuit 12 to modulate data to be sent by the loop coil 4.

The rectification circuit 6 is composed of a diode 13, resistor 14 and a capacitor 15. Of these parts, the diode 13 is connected at the anode thereof to one end of each of the loop coil 4 and capacitor 5 and at the cathode to one end of the resistor 14 and capacitor 15, the resistor 14 and capacitor 15 are connected at the other ends thereof to the other ends of the loop coil 4 and capacitor 5. The rectification circuit 6 outputs the electrical signal resulted by the rectification and smoothing the electrical signal supplied from the loop coil 4 to the regulator 7 and HPF 8.

The regulator 7 is connected to the cathode of the diode 13 in the aforementioned rectification circuit 6 and one end of each of the resistor 14 and capacitor 15. The regulator 7 stabilizes the electrical signal supplied from the rectification circuit 6 by preventing the signal from being varied in voltage due to some data component, and supplies the signal as a DC power to the sequencer 10. Thus, it is possible to suppress a voltage variation caused by a movement of the IC card 1, a voltage variation caused by a change of the power consumption inside the IC card 1, etc. If not suppressed, such voltage variations will lead to a malfunction or the like of the sequencer 10.

The HPF 8 is composed of a capacitor 16 and resistor 17. It extracts the high-frequency component from the electrical signal supplied from the aforementioned rectification circuit 6, and supplies the signal to the demodulation circuit 9.

The demodulation circuit 9 is connected to the other end of a capacitor 16 of the HPF 8 and one end of the resistor 17. It demodulates the high-frequency signal supplied from the HPF 8, and outputs the demodulated signal to the sequencer 10.

The sequencer 10 incorporates a ROM (read-only memory) and RAM (random-access memory), and is connected to the aforementioned demodulation circuit 9. The sequencer 10 stores a signal (command) supplied from the demodulation circuit 9 as a command into the RAM, analyzes the command according to a program held in the ROM, and reads data from the memory 11 as necessary on the basis of the result of analysis or writes data supplied from the demodulation circuit 9 into the memory 11. The sequencer 10 generates a response signal responsively to the command supplied, and supplies the signal to the modulation circuit 12.

The memory 11 is a non-volatile memory such as an EEPROM (electrically erasable programmable read-only memory) needing no power for holding data, and connected to the aforementioned sequencer 10. The memory 11 stores data supplied from the demodulation circuit 9 according to the result of analysis from the sequencer 10.

The modulation circuit 12 is formed from a series circuit composed of an impedance 18 and an EFT (field effect transistor) 19. The impedance 18 is connected at one end thereof to the cathode of the diode 13 in the aforementioned rectification circuit 6, and at the other end to the drain of the FET 19. The FET 19 is connected at the source thereof connected to the ground potential point, and at the gate to the sequencer 10. The modulation circuit 12 is connected in parallel to the loop coil 4 included in the aforementioned resonant circuit and controls the FET 19 to make a switching operation according to a signal supplied from the sequencer 10 in order to change the load of the impedance 18 to the loop coil 4. That is, the modulation circuit 12 adopts the so-called additional modulation method.

The R/W 50 includes a control circuit 51 to control data to be sent and received, a modulation circuit 52 to modulate the data and the power for operation of the IC card 1, a demodulation circuit 53 to demodulate received data, and a loop antenna 54 that couples with an electromagnetic field to send and receive data.

In the R/W 50, the control circuit 51 generates a variety of control signals according to an external instruction and a program held therein, for example, in order to control the modulation circuit 52 and demodulation circuit 53, and also generates send data corresponding to an instruction and supplies the data to the modulation circuit 52. Also, the control circuit 51 generates a reproduce signal according to response data from the demodulation circuit 53, and outputs the data to outside.

In the modulation circuit 52, a transmitter modulates the send data supplied from the control circuit 51, and supplies the modulated signal to the loop antenna 54.

The demodulation circuit 53 demodulates the modulated wave supplied from the loop antenna 54, and supplies the demodulated data to the control circuit 51.

The loop antenna 54 also includes a loop coil formed from a plane winding of a conductor. It radiates an electromagnetic field corresponding to a modulated wave supplied from the modulation circuit 52, and detects a variation of the load to the loop coil 4 at the IC card 1. It should be noted that the loop antenna 54 has a resonance capacitor connected in parallel or in series thereto depending upon an antenna driving method adopted in the R/W 50 as the case may be.

In the RFID system constructed as above, when the IC card 1 is given an instruction for writing a predetermined data, the control circuit 51 in the R/W 50 generates a write command signal on the basis of the instruction, and also generates send data corresponding to the instruction and that is to be write data, and supplies the data to the modulation circuit 52. The modulation circuit 52 modulates the amplitude of oscillation signal on the basis of the supplied signal, and supplies the modulated signal to the loop antenna 54. The loop antenna 54 will thus radiate an electromagnetic wave corresponding to the supplied modulated signal.

Note here that the resonant frequency of the resonant circuit composed of the loop coil 4 and capacitor 5 included in the IC card 1 is set to 13.56 MHz, for example, as a value corresponding to the oscillation frequency that is a carrier frequency from the R/W 50. The oscillation circuit receives the radiated electromagnetic field by oscillation, converts it into an electrical signal, and then supplies the electrical signal to the IC 3. The electrical signal resulted from the electromagnetic field is supplied to the rectification circuit 6, rectified and smoothed by the rectification circuit 6 and then supplied to the regulator 7. The regulator 7 suppresses the voltage variation (data component) of the electrical signal supplied from the rectification circuit 6, and supplies the electrical signal as a DC power to the sequencer 10 after the electrical signal is stabilized.

The signal rectified and smoothed by the rectification circuit 6 is supplied to the HPF 8 via the modulation circuit 12 where a high-frequency component will be extracted from the signal, and then the high-frequency signal is supplied to the demodulation circuit 9. The demodulation circuit 9 demodulates the supplied high-frequency signal and supplies the demodulated signal to the sequencer 10. The sequencer 10 stores the signal supplied from the demodulation circuit 9 as a command into the RAM, analyzes the signal according to the program held in the ROM, and writes write data supplied from the demodulation circuit 9 into the memory 11 on the basis of the result of analysis.

On the other hand, in case the signal supplied from the demodulation circuit 9 is a command corresponding to the read instruction, the sequencer 10 will read data corresponding to the read instruction from the memory 11. The sequencer 10 switches the FET 19 in the modulation circuit 12 correspondingly to the read data. That is, in the modulation circuit 12, when the FET 19 is turned on, the loop coil 4 is connected in parallel to the impedance 18. When the FET 19 is turned off, the parallel connection between the impedance 18 and loop coil 4 is broken. As a result, the impedance of the loop antenna 54 at the R/W 50, magnetically connected to the loop antenna 2 at the IC card 1, varies correspondingly to the read data. Therefore, the terminal potential of the loop antenna 54 will vary correspondingly to the impedance variation, and the R/W 50 is thus enabled to receive the read data since the variation is demodulated by the demodulation circuit 53.

As above, communications are made between the IC card 1 and R/W 50, and the R/W 50 can thus write or read data to or from the IC card 1 in a non-contact manner or by radio.

Figure 6:
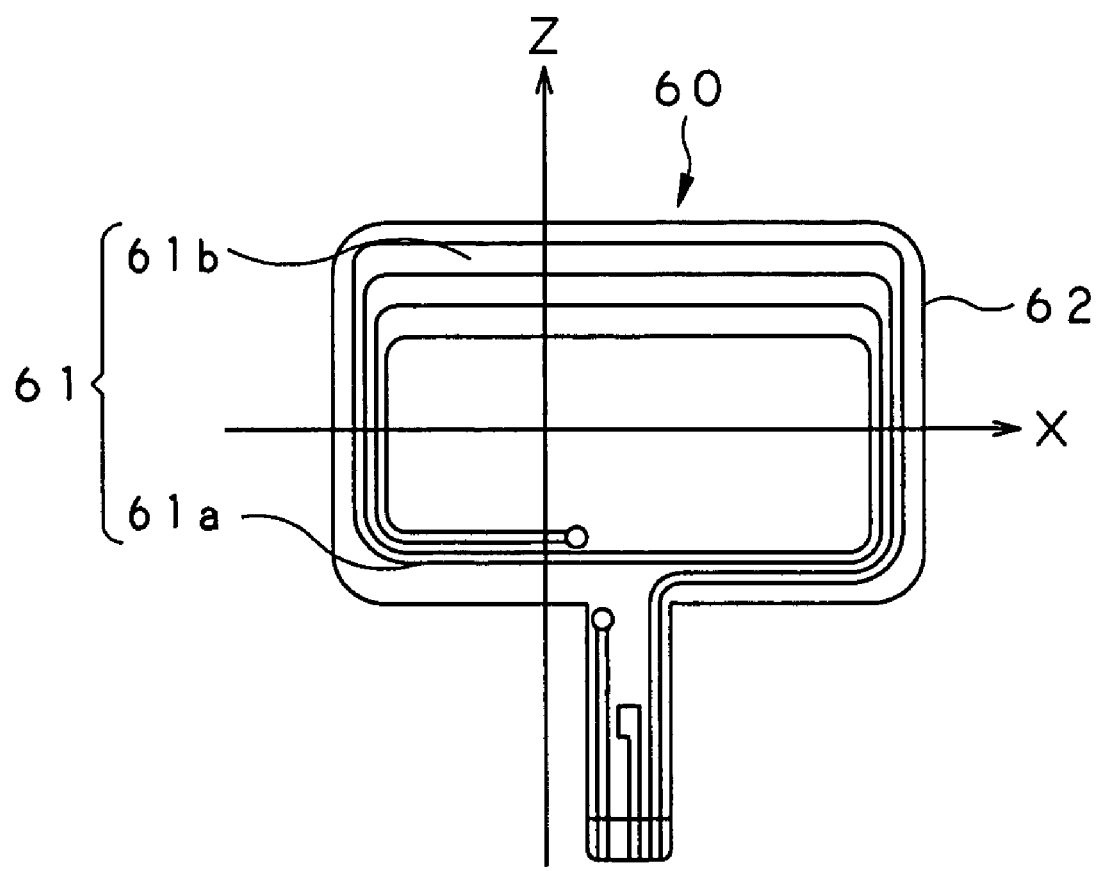
FIG. 6 is a plan view of the antenna device according to the present invention.

Note here that the aforementioned loop antenna 54 at the R/W 50 may be an antenna device constructed according to the present invention as shown in FIG. 6. The antenna device is generally indicated with a reference 60.

Figure 8:
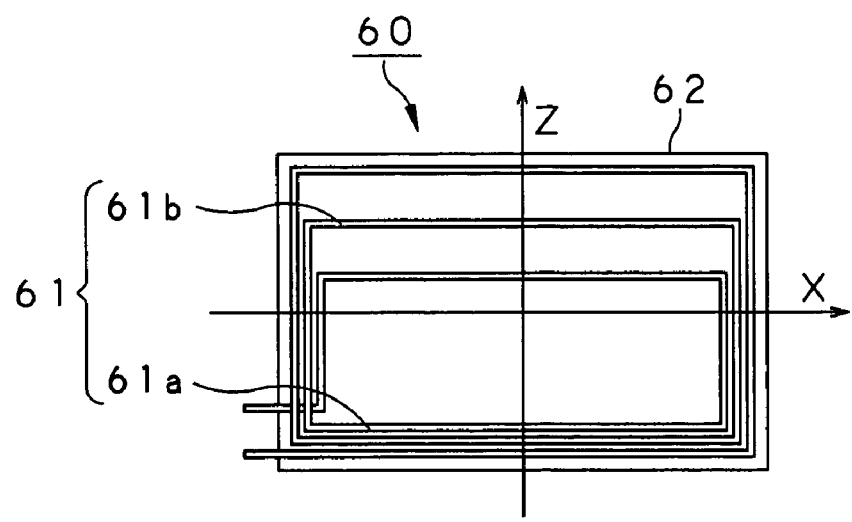
FIG. 8 is a plan view of a variant of the antenna device according to the present invention.

As shown in FIG. 8, the antenna device 60 includes a loop coil 61 for inductive coupling of an electromagnetic field, and a magnetic sheet 62 disposed to face the main side of the loop coil 61, opposite to the main side facing the IC card 1.

The loop coil 61 is formed by etching or other processing of an electroconductive metal foil of electrolytic copper or the like formed on both sides of an insulation film or substrate 63 made of a flexible film of polyimide or mica. It should be noted that the method of forming the loop coil 61 is not limited to the above one but the loop coil 61 may be formed by printing an electroconductive paste such as a silver paste on the film or substrate 63 to form a conductor pattern that provides the loop coil 61 or by sputtering a metal target to form, on the substrate 63, a conductor pattern that provides the loop coil 61.

Also, the loop coil 61 is formed asymmetric for the winding sections opposite to each other across the center of the loop coil 61 to be different in interval and width from each other in one direction. That is, the loop coil 61 includes an upper winding section 61a larger in interval and width in one direction, that is, a vertical direction indicated with an arrow Z in FIG. 6, and a lower winding section 61b smaller in interval and width in that direction Z.

Figure 1:
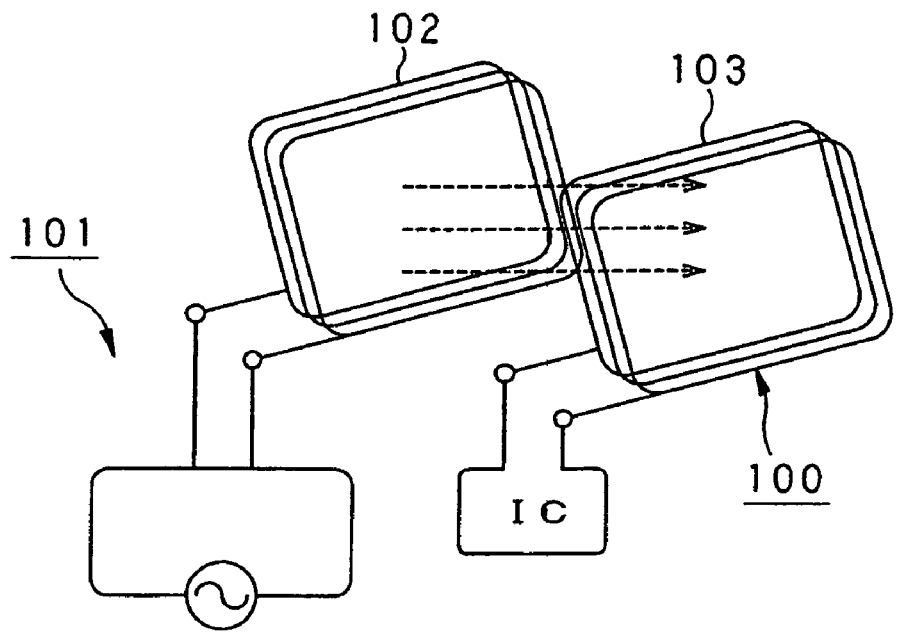
FIG. 1 is a perspective view of the conventional RFID system.
Figure 2:
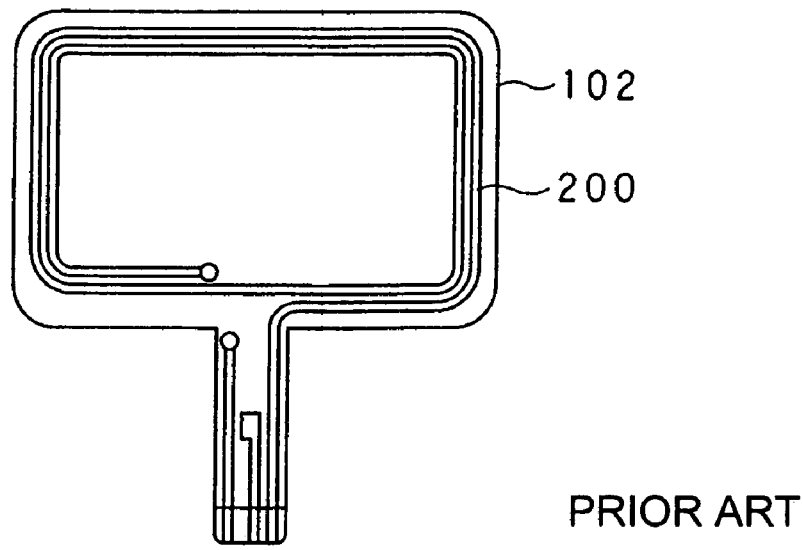
FIG. 2 is a plan view of the conventional R/W (reader/writer) loop antenna.
Figure 3:
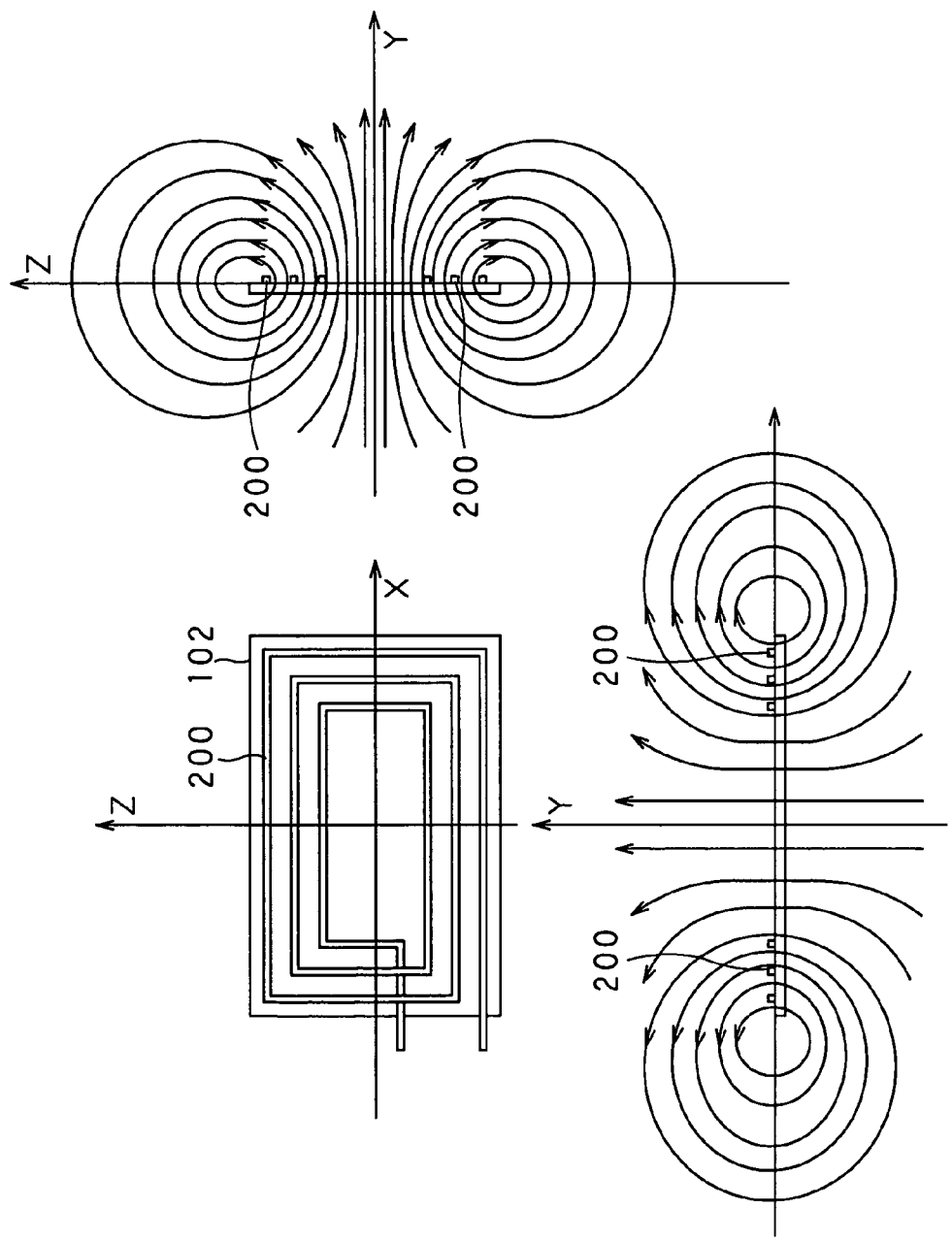
FIG. 3 shows the distribution of a magnetic field developed around the conventional R/W loop antenna.

In this case, the magnetic field distribution in the antenna device 60 is asymmetric and enhanced at the upper winding section 61b of the loop coil 61 where the winding interval and width are large in the Z-directional plane through the center of the loop coil 61 perpendicular to the long side of the rectangular antenna and X-directional plane though the center perpendicular to the short side as shown in FIGS. 7A to 7C. Namely, the magnetic field distribution in the antenna device 60 is different from the symmetric magnetic field around the loop coil 200 shown in FIG. 1.

In the antenna device 60 according to the present invention, the loop coil 61 is formed asymmetric and the distribution of a magnetic field radiated from the loop coil 61 is controlled, whereby the aforementioned range of communications between the IC card 1 and R/W 50 can be widened and the position of communications can be done can be shifted in one direction.

As in FIG. 7B, the winding interval at a side of the loop coil, indicated with a reference Z1, is larger than the conventional one while the winding interval at a side of the loop coil, indicated with a reference Z2, is generally equal to the conventional one. That is, the magnetic field will be distributed more widely at the side Z1 than that at the side Z2. The magnetic field about a point P1 will be weaker than that about a point P2, the points P1 and P2 being positioned at the sides Z1 and Z2, respectively, and equidistant from an origin that is an intersection between the Z and H axes, and the magnetic field will spread in a wide range while the magnetic field density is totally low at the point P1. Thus, the position of communications will be shifted.

Note that the magnetic field distribution at the side Z2 where the winding interval is generally the same as the conventional one is nearly the same as that attained when the winding interval is uniform over the conventional loop antenna.

Since the loop coil 61 can be formed smaller than the loop coil 4 at the IC card 1, the antenna device 60 can be formed even smaller.

Note that the antenna device 60 according to the present invention is not limited to any antenna device in which one winding section of the loop coil 61 is different in both winding interval and width from the other winding section opposite to the one winding section as shown in FIGS. 7A to 7C but the antenna sections of the loop coil 61 may be different in interval alone from each other as shown in FIG. 8 for example.

Figure 9:
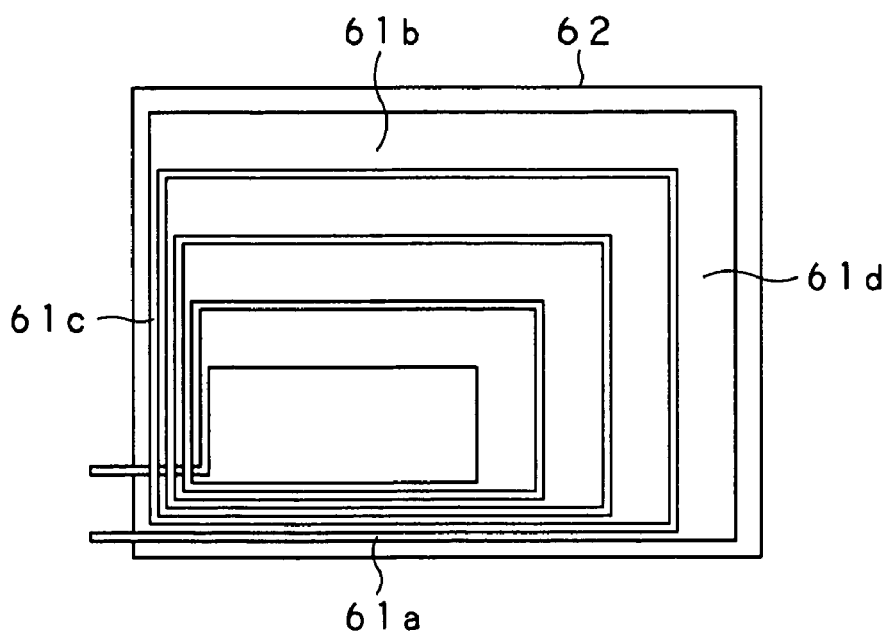
FIG. 9 is a plan view of another variant of the antenna device according to the present invention.
Figure 10:
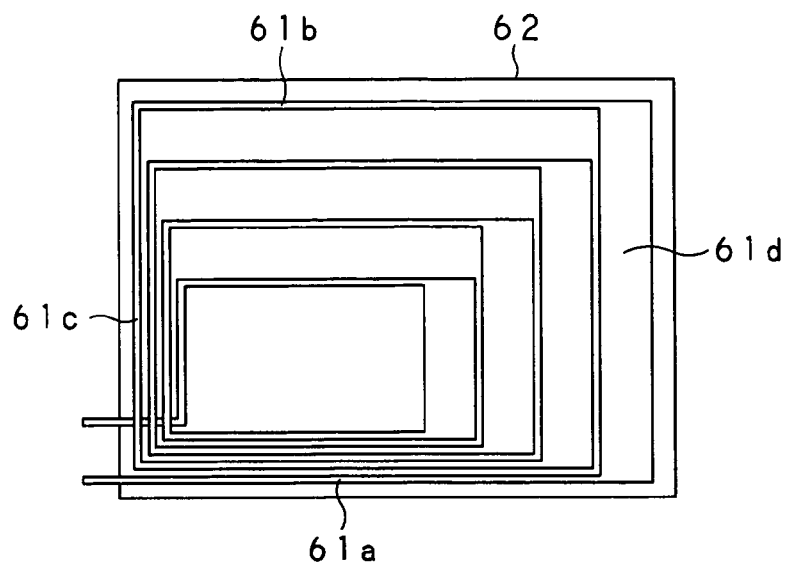
FIG. 10 is a plan view of still another variant of the antenna device according to the present invention.

Also, the loop coil 61 is formed asymmetric in the aforementioned one direction, but it may be formed asymmetric in an arbitrary direction in which it is desired to widen the distribution of radiated magnetic field. For example, the loop coil 61 may be formed asymmetric for the winding sections thereof to be different in winding interval and width from each other in the direction of arrow X perpendicular to the aforementioned direction of arrow Z, as shown in FIGS. 9 and 10. Alternatively, the loop coil 61 may be formed asymmetric for the winding sections thereof to be different in winding interval and width from each other in both the directions of arrows Z and X.

Note that the loop coil 61 shown in FIG. 9 includes, in the direction of arrow Z, the upper winding section 61a where the windings are smaller in interval and width and lower winding section 61b where the windings are larger in interval and width, and in the direction of arrow X, a left winding section 61c where the windings are smaller in interval and width and a right winding section 61d where the windings are larger in interval and width. On the other hand, the loop coil 61 shown in FIG. 10 includes, in the direction of arrow Z, the lower winding section 61a where the windings are smaller in interval and upper winding section 61b where the windings are larger in interval, and in the direction of arrow X, the left winding section 61c where the windings are smaller in interval and width and right winding section 61d where the windings are larger in interval and width.

With the loop coil 61 being formed asymmetric as above, the antenna device 60 according to the present invention can control the distribution of radiated magnetic field about the loop coil 61 and thus arbitrarily adjust the read and write positions the R/W 50 takes in relation to the IC card 1, which will be specially effective in case the loop coil 61 is to be installed in a limited area, especially, when the range of communications with the IC card 1 should desirably be widened only in a special direction.

Figure 11:
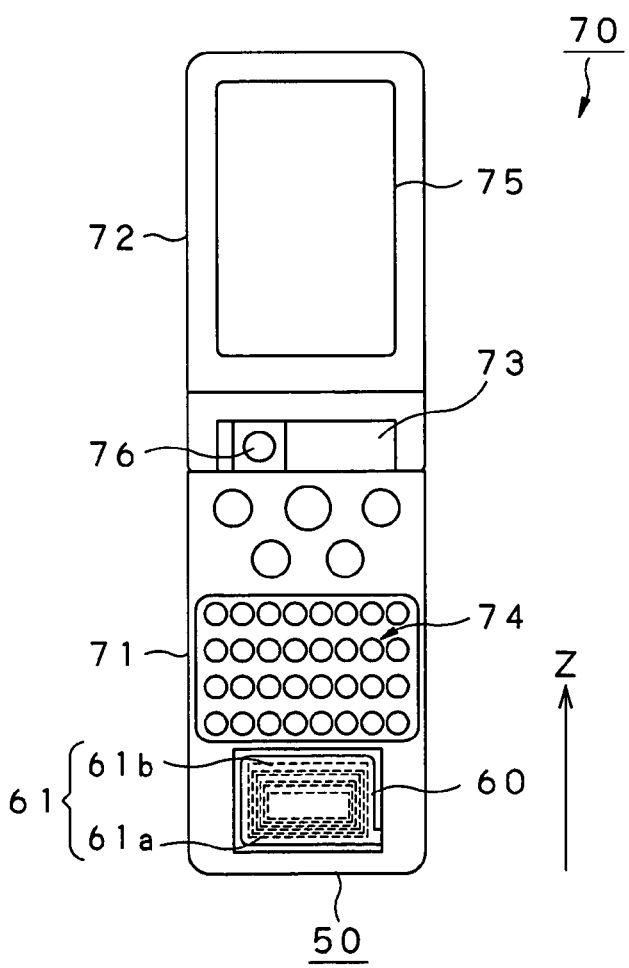
FIG. 11 is a plan view of the communication device using the antenna device according to the present invention.

FIG. 11 shows a communication terminal device, generally indicated with a reference 70, as an example in which the aforementioned RFID system is applied. The present invention will be described herebelow concerning this communication terminal device 70. The communication terminal device 70 uses the aforementioned cubic asymmetric loop antenna 60 as the loop antenna 54 for the R/W 50.

The communication terminal device 70 according to the present invention is a small electronic device the user can carry such as a so-called PDA (portable digital assistant), for example. The small electronic device has functions such as information communication, storage, imaging, etc., for example, integrated in one module.

As shown, the communication terminal device 70 includes a body block 71, display panel block 72 and a hinge mechanism 73 that permits the display panel 72 to be opened from and closed to the body block 71. The body block 71 has provided thereon an input block 74 having operation buttons etc. for various operations of the communication terminal device 70, and below the input block 74 the aforementioned antenna device 60 for the R/W 50.

The body block 71 has built therein a microcomputer (CPU) to control each of the components of the communication terminal device 70. The display panel block 72 has provided thereon a display unit 75 formed from a liquid crystal display (LCD) panel to display a user-made operation of the input block 74, data read from the IC card 1 by the R/W 50, etc. under the control of the CPU. The hinge mechanism 73 has a CCD camera 76 installed thereon. By operating the input block 74, an image captured by the CCD camera 76 can be displayed on the display unit 75.

To assure a sufficient rigidity of the communication terminal device 70 according to the present invention when it is formed small, lightweight and thin, the communication terminal device 70 has a metallic housing formed from a non-metallic material such as a high-rigidity plastics. It should be noted that the housing in consideration is not limited to the non-metallic one but may be a metallic one formed from an Mg alloy or the like for example.

Also, the loop coil 61 of the cubic asymmetric loop antenna 60 is disposed in the aforementioned one direction thereof in which the IC card 1 is scanned. Thus, the IC card 1 will be scanned starting at the side thereof opposite to the input block 74 of the communication terminal device 70, that is, at the lower winding section 61a of the loop coil 61 of the loop antenna 60 where the winding interval and width are smaller.

Figure 12:
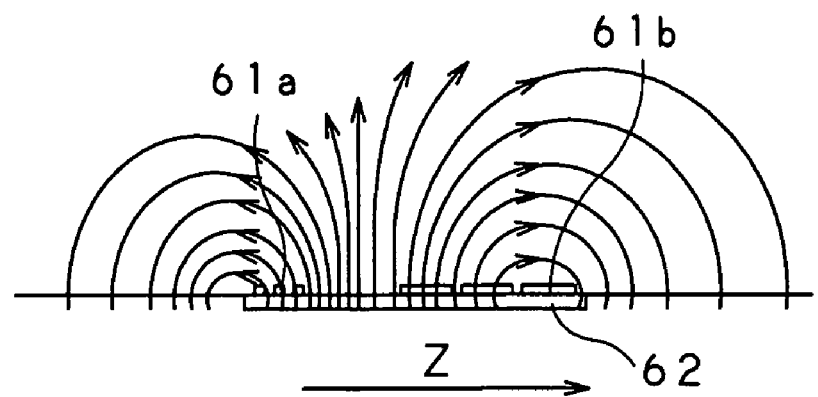
FIG. 12 shows a characteristic curve of the distribution of a magnetic field developed around the antenna device disposed in the communication device.

In this case, the magnetic field distribution around the cubic asymmetric loop antenna 60 is enhanced in the upper winding section 61b of the loop coil 61 where the winding interval and width are larger, as shown in FIG. 12.

Figure 4:
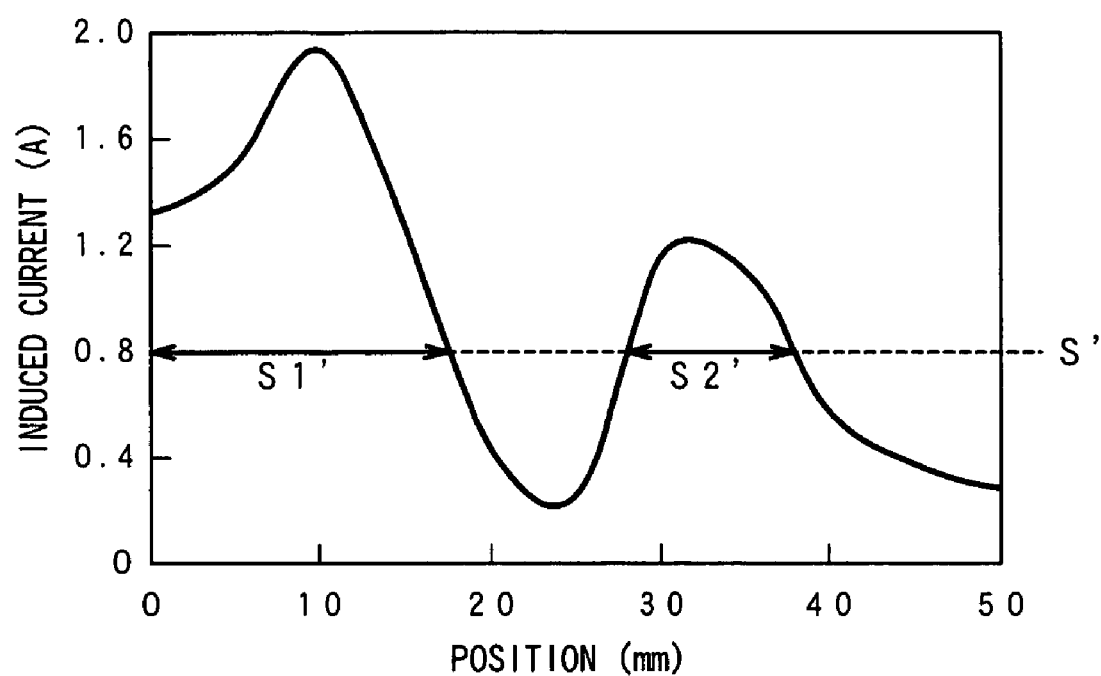
FIG. 4 shows a characteristic curve of a performance of communications between the conventional R/W loop antenna and IC card.
Figure 13:
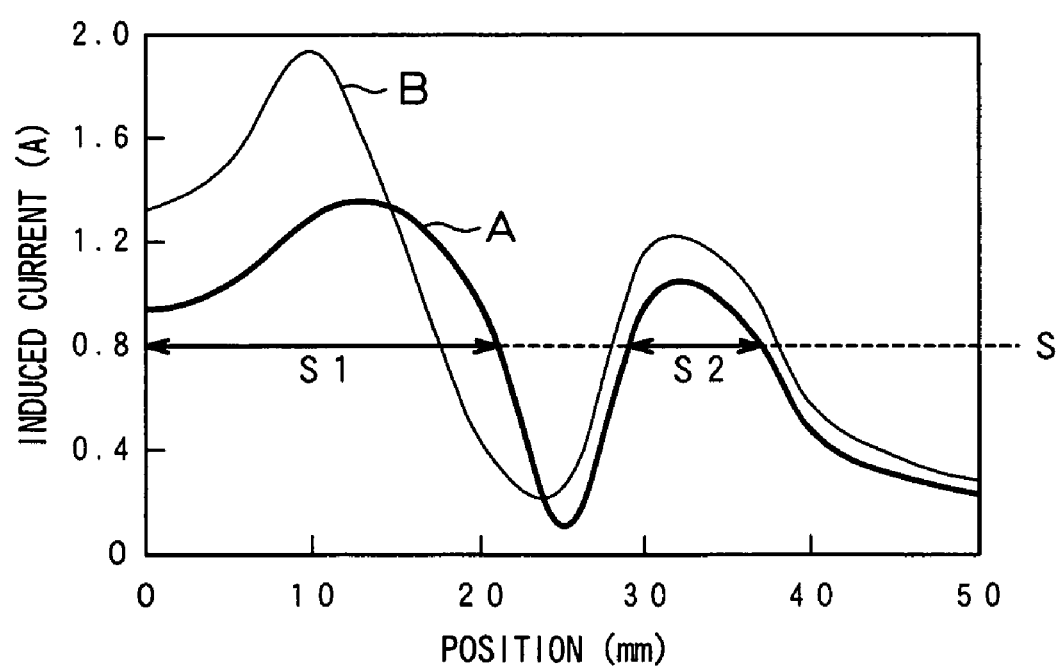
FIG. 13 graphically illustrates, by induced current characteristic, the performance of communication of the antenna device according to the present invention with the IC card.

FIG. 13 shows the dependence, on the card position, of the strength of a current induced in the IC card 1 by the antenna device 60. In FIG. 13, the origin "0" on the horizontal axis indicates the center of the loop antenna 54 at the R/W 50 and the positive-going direction indicates a direction in which the IC card position is shifted outwardly from the origin "0". On the other hand, the vertical axis indicates the strength of a current electromagnetically developed on the loop antenna 2 at the IC card 1 by the magnetic field around the loop antenna 54 at the R/W 50 and communications are possible in an area above a value indicated with a dashed line S in FIG. 13. In FIG. 13, a thin line A indicates a characteristic of the plane symmetric loop antenna 60 according to the present invention and a thicker line B indicates a characteristic of the conventional symmetric loop antenna 102 in FIG. 4 being given for comparison.

The loop antenna 60 according to the present invention has a communication area S1 in the upper winding section 61b and communication area S2 in the lower winding section 61a, these lower and upper winding sections 61a and 61b being opposite to each other across the center of the loop coil 61. Of these communication areas, the communication area S1 in the upper winding section 61b can be winded as shown in FIG. 13. Therefore, in the communication terminal device 70, since the communication area S1 can be continuously widened outwardly from the origin "0", the performance of communication can be improved and the communication with the IC card 1 is possible also near the center of the body block 71 of the device 70. So, the user can easily use the communication terminal device 70 with an awareness of the communication between the device 70 and IC card 1.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, since the loop coil of the antenna device according to the present invention is formed asymmetric, it is possible to control the distribution of a magnetic field radiated from the loop coil and thus provide a wider range of communications between the IC card and reader/write. Thus, the antenna device can be designed to be even smaller and have an improved performance, and hence the communication device using the antenna device can be designed to be even smaller and have an improved performance.

The invention claimed is:

1. An antenna device that makes data communications with a contactless IC card by electromagnetic-inductive coupling, the device comprising:
    an asymmetric loop coil means formed from a winding of a conductor in a plane, whose sections opposite to each other across a center of the loop coil are different in interval from each other, the sections including a first section on a first side of the center of the loop coil and a second section on a second side of the center of the loop coil, the first section being wider in interval than the second section; and
    a lead means for supplying a power to the loop coil means;
    wherein the loop coil means, when supplied with power from the lead means, generates a magnetic field which is distributed asymmetrically with respect to the center, such that the magnetic field is stronger at the first section than at the second section.

2. The device as set forth in claim 1, wherein a first winding section of the loop coil means, of which the winding interval is larger than that in the opposite winding section, a wider range of communications with the IC card can be achieved.

3. The device as set forth in claim 1, wherein the loop coil means is smaller in plane area than a loop antenna provided in the contactless IC card with which it is electromagnetically coupled.

4. The device as set forth in claim 1, wherein in the loop coil means, the winding interval is wider in a plurality of positions other than a first position.

5. The device as set forth in claim 1, wherein the loop coil means is formed to have a generally square shape having four straight sides.

6. A communication device that makes data communications with a contactless IC card by electromagnetic inductive coupling, the device comprising:
    an antenna means capable of electromagnetic inductive coupling with an antenna included in the contactless IC card;
    a modulating means for modulating send data to a predetermined carrier signal in order to communicate with the IC card with no contact with the antenna means; and
    a demodulating means for demodulating receive data sent from the IC card electromagnetically coupled to the antenna means, the antenna means being disposed in a predetermined place on a housing of the communication device, in which it can be electromagnetically coupled to the contactless IC card; and the antenna means being a loop coil formed by winding a conductor like a loop generally in a plane for winding sections thereof opposed to each other across a center of the loop to be different in interval from each other, the sections including a first section on a first side of the center of the loop coil and a second section on a second side of the center of the loop coil, the first section being wider in interval than the second section, wherein the loop coil is operable to generate a magnetic field which is distributed asymmetrically with respect to the center, such that the magnetic field is stronger at the first section than at the second section.

7. The device as set forth in claim 6, wherein one of the winding section of the loop coil means, that is wider in winding interval than the other, is disposed near a position on a housing of the communication device where communications with the IC card is made.

8. The device as set forth in claim 6, being of a hand-held type.

9. The device as set forth in claim 6, wherein the loop coil means is smaller in plane area than a loop antenna provided in the contactless IC card with which it is electromagnetically coupled.

* * * * *